US012561280B2

(12) United States Patent
Shaw et al.

(10) Patent No.: US 12,561,280 B2
(45) Date of Patent: Feb. 24, 2026

(54) CLOUD-NATIVE GLOBAL FILE SYSTEM WITH DIRECT-TO-CLOUD MIGRATION

(71) Applicant: Nasuni Corporation, Boston, MA (US)

(72) Inventors: Daphne Shaw, Newton, MA (US);
Nicholas A. Fisher, Canton, MA (US)

(73) Assignee: Nasuni Corporation, Boston, MA (US)

( * ) Notice: Subject to any disclaimer, the term of this patent is extended or adjusted under 35 U.S.C. 154(b) by 0 days.

(21) Appl. No.: 18/588,795

(22) Filed: Feb. 27, 2024

(65) Prior Publication Data

US 2024/0354282 A1      Oct. 24, 2024

Related U.S. Application Data

(63) Continuation of application No. 16/234,658, filed on Dec. 28, 2018, now Pat. No. 10,489,344.

(51) Int. Cl.
| | |
|---|---|
| *G06F 16/188* | (2019.01) |
| *G06F 16/11* | (2019.01) |
| *G06F 16/18* | (2019.01) |
| *G06F 16/182* | (2019.01) |
| *G06F 16/185* | (2019.01) |

(52) U.S. Cl.
CPC .......... *G06F 16/119* (2019.01); *G06F 16/182* (2019.01); *G06F 16/185* (2019.01); *G06F 16/1873* (2019.01); *G06F 16/196* (2019.01)

(58) Field of Classification Search
CPC ................................................ G06F 16/10–196
See application file for complete search history.

(56) References Cited

U.S. PATENT DOCUMENTS

| | | | | |
|---|---|---|---|---|
| 9,619,258 | B2 * | 4/2017 | Abali .................... | G06F 9/4856 |
| 10,089,176 | B1 * | 10/2018 | Donlan ............... | H04L 67/1097 |
| 10,108,692 | B1 * | 10/2018 | Stickle .................. | G06F 16/285 |
| 2017/0132222 | A1 * | 5/2017 | Li ........................... | G06F 16/94 |
| 2019/0213123 | A1 * | 7/2019 | Agarwal ............... | G06F 3/0608 |

* cited by examiner

*Primary Examiner* — Robert W Beausoliel, Jr.
*Assistant Examiner* — Nirav K Khakhar
(74) *Attorney, Agent, or Firm* — David H. Judson

(57) ABSTRACT

A cloud-native global file system to provide primary file storage for enterprise data is augmented to provide "direct-to-cloud" (D2C) migration of a data set. In addition to providing a filer, the service provider configures a direct-to-cloud migration tool executed in association with the hardware of the enterprise filesystem whose data set is being migrated. The migration tool reads the existing filesystem, transforms the data into a format consistent with that done by a filer, and pushes the result directly to an object store in the cloud. In a first pass, typically a large bulk of the data is moved and, depending on how the migration tool is configured, one or more additional passes may then be carried out. When migration is complete (or substantially complete), the filer then is activated to complete the migration (if need be) and take over the go-forward operations.

8 Claims, 5 Drawing Sheets

100        104        102

| LOCAL FILE SYSTEM | VERSIONED FILE SYSTEM INTERFACE | OBJECT-BASED DATA STORE |

Perform FTW over
subtree into
database    600

⇩

Identify and
consume file
portions    602

⇩

Create chunks, push
to cloud, and
generate handles    604

⇩

Construct XML for
the subtree and
push to cloud    606

⇩

Delete orphan
objects    608

CLOUD-NATIVE GLOBAL FILE SYSTEM WITH DIRECT-TO-CLOUD MIGRATION

BACKGROUND OF THE INVENTION

This application relates generally to data storage.

It is known to provide a cloud-native global file system that is used to provide primary file storage for enterprise data. In this approach, edge appliances (or "filers") typically located on-premises securely transmit all files, file versions and metadata to a preferred private or public cloud object store, while locally caching only active files. The appliances are stateless, and multiple appliances can mount the same volume in the cloud. As files are written locally, an authoritative copy of every file and metadata (inodes) are stored in the cloud. The system provides a single, unified namespace for all primary file data that is not bound by local hardware or network performance constraints. The above-described approach to enterprise file services also has been extended to provide multiple-site/multiple-filer access to the same namespace, thereby enabling participating users with the ability to collaborate on documents across multiple filers/sites. A system of this type is available commercially from Nasuni® Corporation of Boston, Massachusetts.

While the above-described solution provides significant advantages, initial data migration is often a challenge with respect to cache and copy-on-write (COW) management. This is because the data set being migrated is generally larger than the cache, and it is always larger than the COW. In a typical migration, the filer has to perform multiple snapshots, with each containing a portion of the overall data set. As a result, the migration may be relatively slow, and this issue may be exacerbated if the enterprise is using portions of the data set during the actual migration.

SUMMARY OF THE INVENTION

According to this disclosure, and in lieu of relying on the on-premises filer for overall migration of the initial data set, a "direct-to-cloud" (D2C) migration is utilized. In this approach, direct-to-cloud migration of the initial enterprise data set is carried out as follows. In addition to providing the filer, the service provider configures a direct-to-cloud migration tool, typically as a downloadable virtual machine (VM), that is executed in association with the hardware of the enterprise filesystem whose data set is being migrated to the cloud-native global file system. The migration tool reads the existing filesystem, transforms the data into a format consistent with that done by a filer, and pushes the result (a single version) directly to an object store in the cloud. In a first pass (run), typically a large bulk of the data is moved and, depending on how the migration tool is configured, one or more additional passes may then be carried out to complete the migration. Thus, for example, in one approach a subsequent pass is used to migrate data that has been found to have changed since a prior pass; as the number of changes found after a given pass is low enough, the filer then is activated to complete the migration (if need be) and take over the go-forward operations (with full local caching and copy-on-write processing). Once migration is complete, the migration tool can be removed or simply inactivated. Direct-to-cloud migration in this manner significantly reduces the complexity of migrating the initial data set, thereby enhancing the overall value of the service to the enterprise customer.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the present invention and the advantages thereof, reference is now made to the following descriptions taken in conjunction with the accompanying drawings, in which.

DETAILED DESCRIPTION OF THE INVENTION

Figures 1, 2:
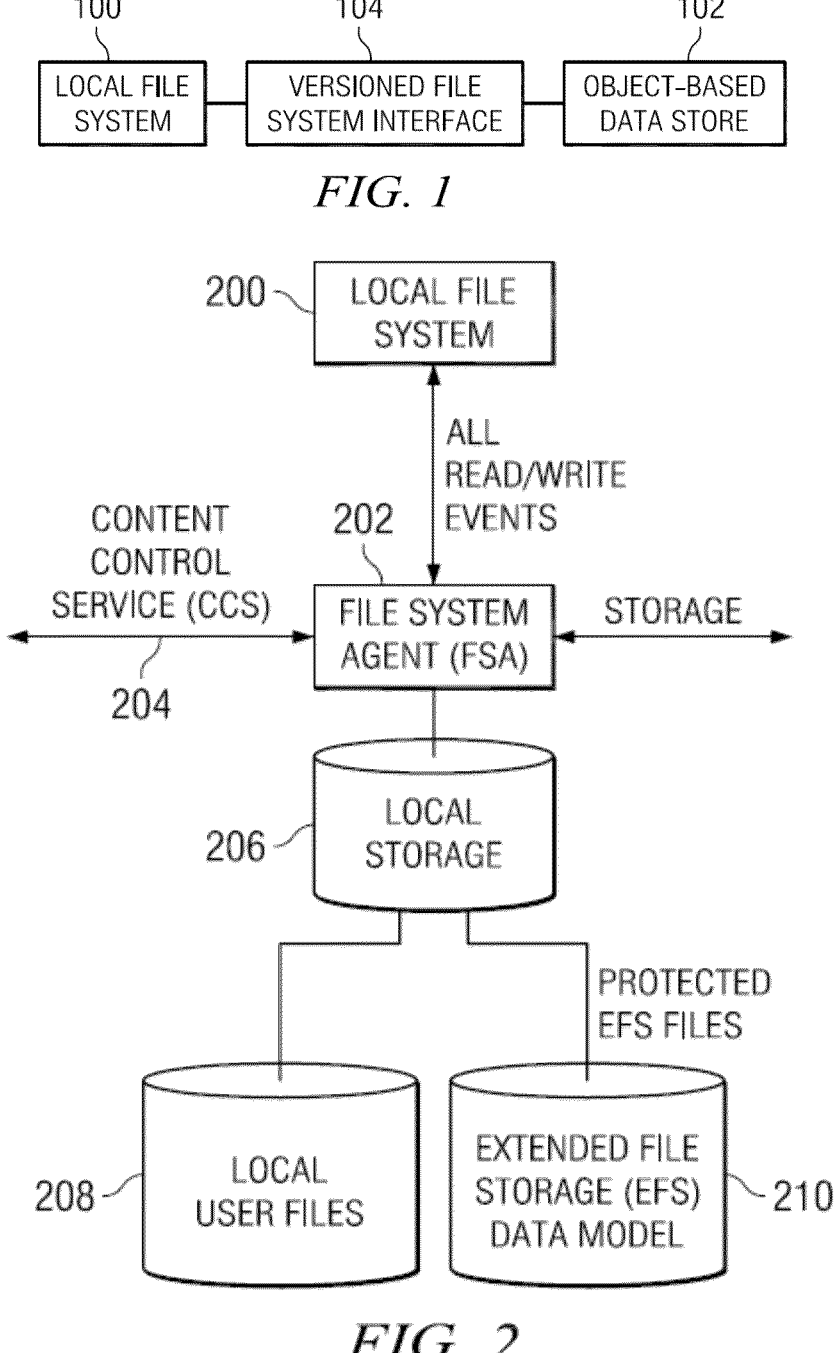
FIG. 1 is a block diagram illustrating how a known versioned file system interfaces a local file system to an object-based data store.
FIG. 2 is a block diagram of a representative implementation of a portion of the interface shown in FIG. 1.

FIG. 1 illustrates a local file system 100 and an object-based data store 102. Although not meant to be limiting, preferably the object-based data store 102 is a "write-once" store and may comprise a "cloud" of one or more storage service providers. An interface 104 (or "filer") provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e. a storage system internal to an enterprise), an external storage cloud, or some combination thereof.

The interface 104 may be implemented as a machine. A representative implementation is the Nasuni® Filer, available from Nasuni® Corporation of Boston, Massachusetts. Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS™). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
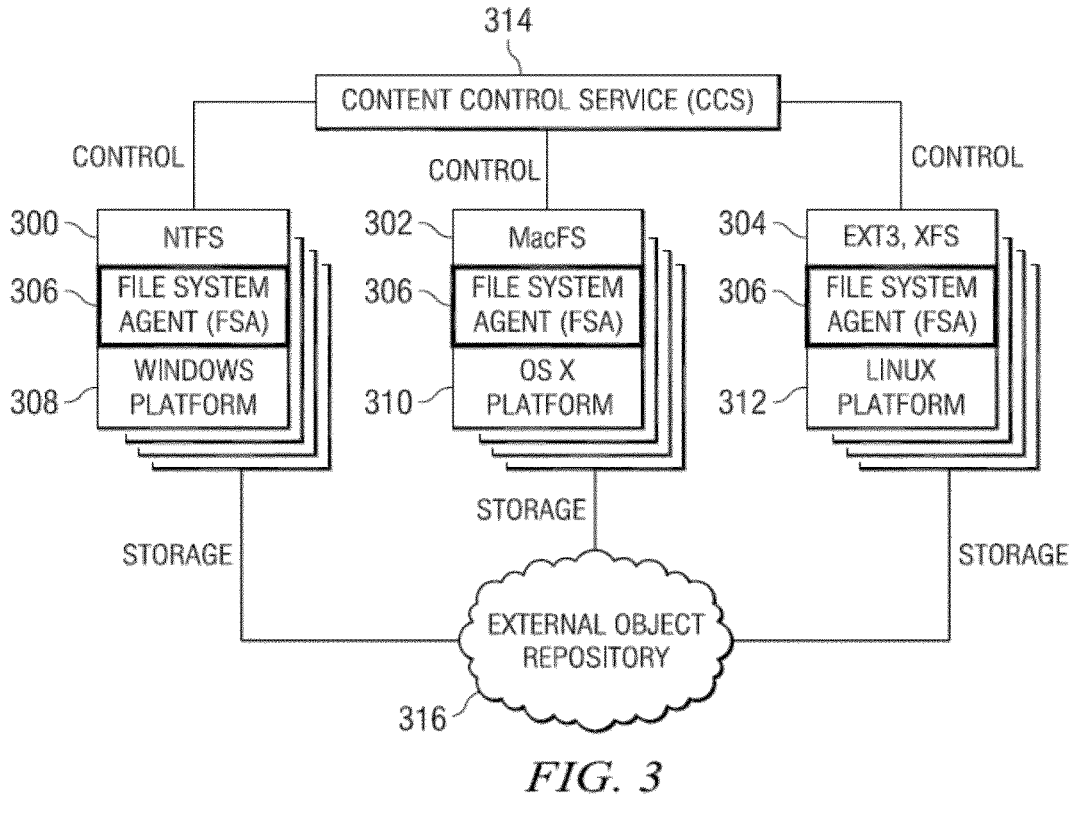
FIG. 3 is a more detailed implementation of the interface where there are a number of local file systems of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local file systems: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
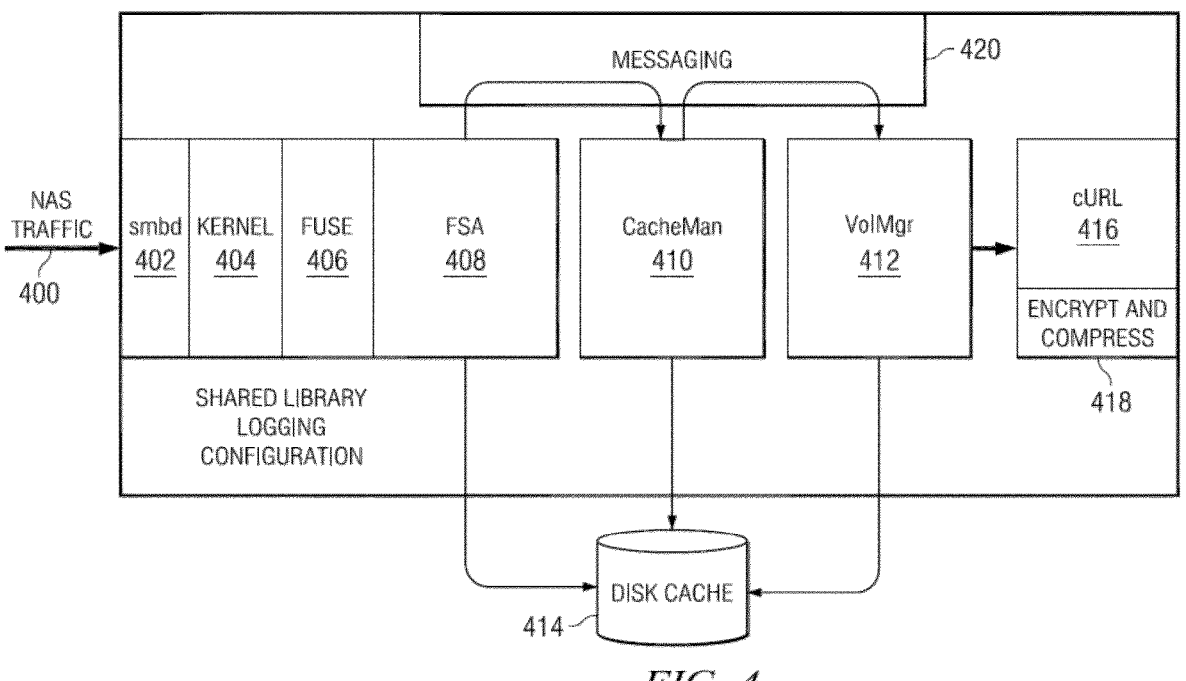
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CIFS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. CURL is a library and command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent 408 is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file. These and other advantages are provided by the "versioned file system" of this disclosure, as it now described in more detail below.

For more details concerning the filer as described above, the disclosure of U.S. Pat. No. 9,575,841 is hereby incorporated by reference.

Figure 5:
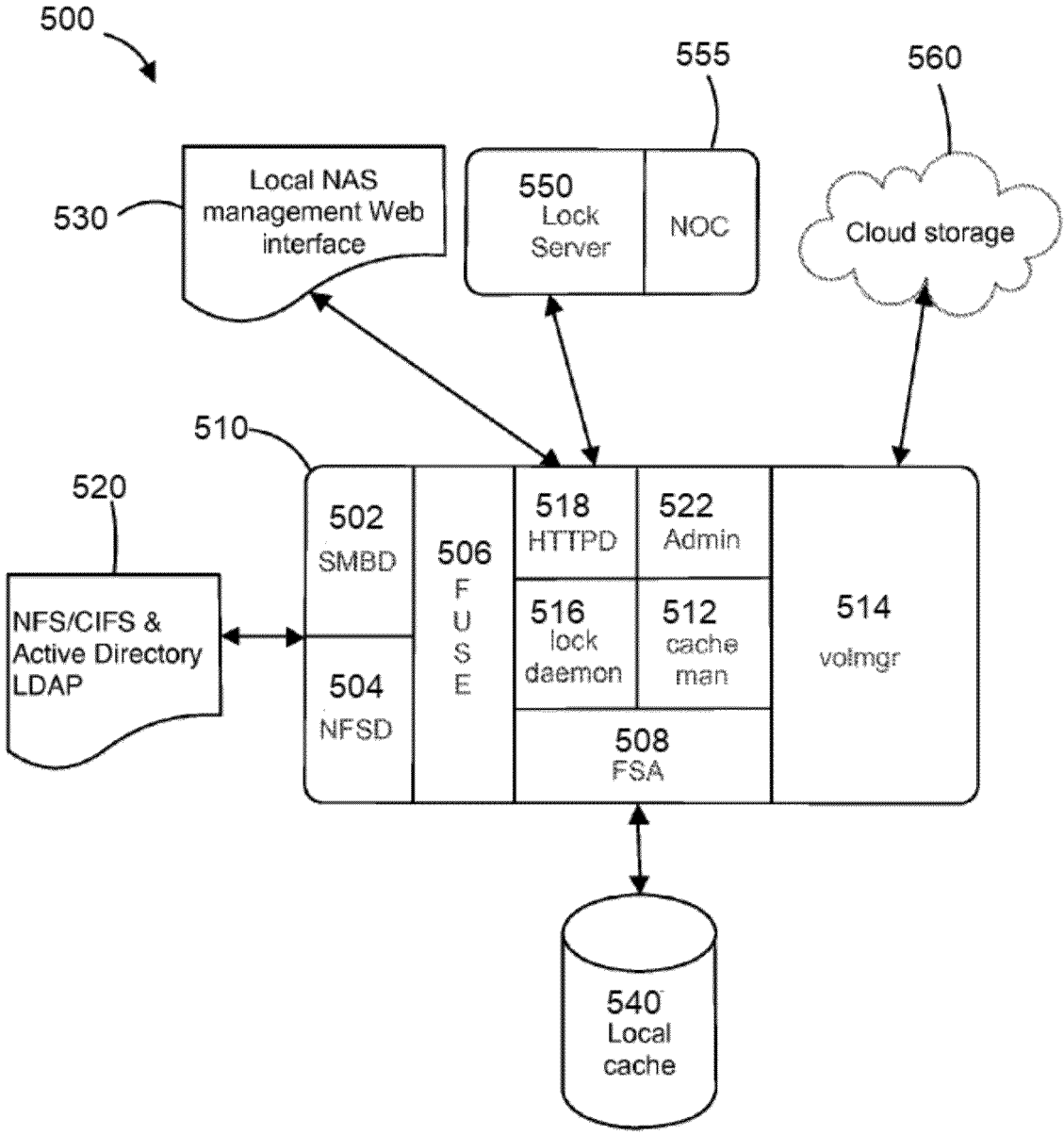
FIG. 5 depicts a versioned file system that implements global locking.

FIG. 5 is a block diagram that illustrates a system 500 for managing a versioned file system (as described above) that also includes the capability of global locking. The system 500 includes an interface 510 in communication with local traffic 520, a web-based portal 530, a local cache 540, a lock server 550, and cloud storage 560. The interface 510 includes a SMBD layer 502, a NFSD layer 504, a FUSE module 506, a FSA 508, a cache manager 512, a volume manager 514, a lock daemon 516, a transport layer 518, and an administrative module 522. In some embodiments, the interface 510 is the same as the interface described with respect to FIG. 4 but with the addition of the lock daemon 516.

SMB/CIFS lock requests are intercepted by SMBD layer 502, which is a SAMBA file server daemon. An optional Virtual File System (VFS) module can extend the SAMBA server daemon to send the local lock information to the FSA 508. FSA 508 then communicates with FUSE 506 to coordinate the FUSE file descriptors (pointers) with the ioctl information to determine a path for the given file(s) associated with the lock request. Assuming a path is enabled for global locking, FSA 508 sends the lock and path to the lock daemon 516, which handles the lock request as described below. If a path is not enabled for global locking, the lock request stays within the SAMBA server as it did previously (e.g., conflict management, etc. as described above) and it is not sent to the lock daemon 516.

NFS lock requests are passed through the NFSD layer 504 to FUSE 506. Assuming a path prefix is enabled for global locking, FSA 508 communicates with the lock daemon 516 to handle the lock request using a common protocol, as described above. If the path prefix is not enabled for global locking, FSA 508 handles the lock request as it did previously (e.g., conflict management, etc. as described above) and the lock request is not sent to the lock daemon 516.

The lock daemon 516 is responsible for local lock management and coordinating with the global lock server. The lock daemon 516 can perform one or more of the following functions: (a) translating the lock format; (b) communicating with the centralized lock server; (c) acquiring locks; (d) lock peeking; (e) lock re-acquiring; (f) lock releasing; and (g) communicating with the filer.

With respect to translating the lock format, the lock daemon 516 can translate the local file lock requests to a common lock format understood by the centralized lock server 550 (described below). Using this approach, the lock server 550 receives a lock request in one format regardless of the underlying network protocol (e.g., SMB/CIFS or NFS). The centralized lock server 550 can be in a network operations center (NOC) 555.

The lock daemon 516 can then communicate with the centralized lock server 550 by making calls to a Centralized Lock API. Through the API, the lock daemon 516 can execute a lock request, an unlock request, and/or a lock break request. A lock request generally requires the transmission of certain information such as the first handle (a unique identifier to the original base object for the file), the requested lock mode, the file path, the protocol of the requester, etc. Additional information such as timestamps and serial number can be included in the lock request. The requested lock mode is the type of access for the lock, such as a shared or exclusive lock, a lock for read, a lock for write, lock for exclusive write, lock for shared write. If the centralized lock server 550 grants the lock request, the lock server 550 then uses information provided in the lock request (e.g., the first handle) to retrieve the latest version of the requested file from cloud storage 560. The centralized lock server 550 transmits the latest version of the requested file to the lock daemon 516, which can store the file in local cache 540.

An unlock request can include the same or similar information as the lock request but with an updated handle name that was generated as a result of modifications to the locked file. A lock break request can be provided by a system administrator to manually unlock a file (e.g., if a user leaves a locked file open overnight, a server goes down, etc.).

Prior to making a new lock request, the lock daemon 516 determines whether a lock already exists in local cache 540 or on the centralized lock server 550. If no lock exists in either of those locations, the lock daemon 516 acquires a new lock through the centralized lock server 550. The new lock can have a lock mode computed using the requested access and share profiles (masks).

Lock peeking can be initiated every time a file is opened for read. In lock peeking, the lock daemon 516 can query whether a lock exists on the file prior to opening the file. If a lock exists, the lock daemon 516 can also determine the associated lock mode to evaluate whether the lock mode permits the user to open the file. The lock daemon 516 retrieves this information from local lock cache 540 if the filer requesting the lock peek already has a write lock on the file. Otherwise, the lock daemon 516 retrieves this information from the centralized lock server 550. Each lock peek request can be cached in the local lock cache 540 for a short time period (e.g., several seconds) to reduce traffic to the central lock server 550 if the lock daemon 516 receives a new lock peek request shortly after the first lock peek request.

For example, another user may have a lock for exclusive write access to the file that does not allow any shared access (i.e., no shared read access). In this example, the lock daemon 516 determines from the lock query that the file cannot be opened due to an existing lock on the file. In another example, the lock mode can allow shared read or write access in which case the lock daemon 516 determines from the lock query that the file can be opened.

During lock peeking, the lock daemon 516 can also retrieve additional information about the file, such as the file handle, handle version, first handle, and lock push version. The file handle is a pointer to the latest version of the file in the cloud. The handle version is a version of the file in the cloud. The first handle provides a unique identifier to the file across versions and renames of the file. The lock push version is the latest version of the file that was sent to the cloud.

The lock deamon 516 can cache locks and unlocks in a local lock cache 540 for release to the centralized lock server 550. If a lock request is made for a file that has a cached unlock request, the lock can be reestablished without having to acquire a new lock from the centralized lock server 550. In such a situation, the unlock request is cancelled. This caching can reduce load on the lock server 550 and improve response time. In general, the unlock requests are cached for a certain period of time prior to release to the lock server 550 to allow for such lock reestablishment.

As discussed above, the lock request includes information on the protocol (e.g., SMB/CIFS or NFS) of the requester and the lock mode. The lock server 550 receives this information and can determine, based on any existing lock (s) on the requested file, whether the lock server 550 can issue multiple locks on the same file. The lock server 550 can evaluate the protocol used by the requester of the existing lock and the associated access/share permissions of that lock and determine whether protocol used with the new lock requester is compatible.

In addition, the lock daemon 516 handles lock releases. In some embodiments, the lock daemon 516 does not immediately send the lock release to the lock server 550. This time delay can reduce load on the centralized lock server 550 because files are frequently locked and unlocked in rapid succession, as discussed above. Before a lock is released, if the file was changed, the current data is sent to cloud storage 560 (e.g., Amazon S3, Microsoft Azure, or other public or private clouds) so the most recent data is available to the next locker.

Finally, the lock daemon 516 can communicate with the FSA 508. The lock daemon 516 can receive lock requests and/or lock peek requests from FSA 508, which the lock daemon 516 translates into a common protocol for transmission to the centralized lock server 550, as discussed above. The lock daemon can also pass the updated handle name to the FSA 508 to perform a file-level snapshot before unlocking a file and/or a file level merge/synchronization before locking a file.

For global locking, it is desirable for the locker to have the most recent version of the file associated with the lock request (and lock grant). To accomplish this, the cache manager 512 can be configured to snapshot a single file (e.g., the file associated with the lock request) without triggering a copy-on-write (COW) event (which would cause a version update, as discussed above) and without affecting other snapshot operations. After a single file snapshot, the cache manager 512 can mark all parent directories of the file as changed or "dirty." In addition, the fault manager algorithm can be configured to fault a single file based on requests from the FSA 508.

The merge/push algorithm can be modified to provide for merging single files. Before the locked file is pushed to the local cache 540, the NOC 555 assigns a unique lock version (e.g., 64 bit) to the file. The lock version can be used by FSA 508 to determine whether a locked file or its metadata is dirty (i.e., changed). The parent directories of the locked file can continue to use the existing write version assigned from the last TOC. Thus, FSA 508 can track two values: lock_write_version and lock_push_version. When a file or directory is dirtied, the lock_write_version is updated. When a file or directory is pushed to local cache 540, the lock_push_version is updated.

As discussed above, the file data from the NOC 555 (or centralized lock server 550) is merged into the local cache 540 before the FSA 508 returns control of the file to the client. To determine if the file data in the NOC 555 is newer than the file data in the cache 540 (e.g., if the lock is retrieved while an unlock request is cached), the FSA checks MAX (lock_write_version, lock_push_version) against the NOC lock version. If the NOC lock version is greater than the lock_write_version and the lock_push_version, the file data (object metadata and data) from the NOC 555 is used to instantiate the object (locked file) in the local cache 540. If the file data in the cache 540 is newer, then the file data from the NOC 555 is discarded. In the circumstance where the NOC 555 indicates that the file is deleted, the delete version is compared to the local cache 540 version in order to apply the delete to the local cache 540.

In addition, the merge/push algorithm can be modified to reconcile the single-file merges of locked files with the snapshot merges of files. Any file that was "fastsynced" through the FSA 508 (i.e., locked) or "fastpushed" to the cloud (i.e., unlocked) is designated as "cloud fastsynced." When merging an object or file that is considered "cloud dirty" or "cloud fastsynced," the FSA 508 will update the file if the incoming lock_push_version is greater than MAX (lock_write_version, lock_push_version), as discussed above. If the incoming lock_push_version is less than MAX (lock_write_version, lock_push_version), the cache object is considered newer and the incoming update is discarded by the FSA 508. Also, when a file is missing (deleted) from the pushed version but the file is also locally fastsynced, the file will not be deleted. This merging can occur concurrently or before the global lock on the file is granted.

In addition, if a file has been deleted or renamed, the local cache metadata can record a "delete tombstone" which includes certain information (e.g., parent first handle, lock version, name, etc.). FSA 508 merges a file as new if the file is newer than any delete tombstone contained in the cache for the unique file. This can address the situation in which a file has been fast synchronized before merge. In that case, the incoming cloud dirty file is old compared to the cache and the import is discarded.

To ensure that the unlocked file includes the changes from the latest version, the locked file can only be unlocked when the lock_push_version is greater than or equal to the lock_write_version at which point the FSA 508 sends the lock_push_version back to the NOC 555 (or centralized lock server 550) to store the new version of the file in cloud storage 560.

In some embodiments, the interface 510 snapshots and merges new files at the time of creation. The new file requests can be stored on the lock server 550 with the lock entries. Other users can poll the lock server 550 to determine if new files/objects exist that have not yet been populated to the cloud 560, for example if there are new files/objects in a given directory. After the new files have been created, the locker server 550 can merge the new file requests into the appropriate directories in the cloud 560.

The filers may be anywhere geographically, and no network connectivity between or among the filers is required (provided filers have a connection to the service).

Sharing enables multi-site access to a single shared volume. The data in the volume is 100% available, accessible, secure and immutable. The approach has infinite scalability and eliminates local capacity constraints. The sites (nodes) may comprise a single enterprise environment (such as geographically-distributed offices of a single enterprise division or department), but this is not a requirement, as filers are not required to comprise an integrated enterprise. This enables partners to share the filesystem (and thus particular volumes therein) in the cloud. Using the service provider-supplied interfaces, which are preferably web-based, the permitted users may set up a sharing group and manage it. Using the sharing approach as described, each member of the sharing group in effect "sees" the same volume. Thus, any point-in-time recovery of the shared volume is provided, and full read/write access is enabled from each node in the sharing group.

Direct-to-Cloud (D2C) Migration

As has been described, according to this disclosure a cloud-native global file system (such as described above and depicted in FIGS. 1-5) used to provide primary file storage for enterprise data is augmented to provide "direct-to-cloud" (D2C) migration of an initial data set. As used herein, the notion of an "initial data set" refers to the data from a given local filesystem in the enterprise whose file storage is intended to be provided by the filer. To this end, and in addition to providing a filer (such as depicted in FIG. 4), the service provider configures and exposes to the enterprise a direct-to-cloud migration tool. In one embodiment, the migration tool is implemented as a downloadable virtual machine (VM) that is executed in association with the hardware of the enterprise filesystem whose data set is being migrated. In another embodiment, the migration tool is configured for download as a simple program or process that is executed in the local computing environment. In still another embodiment, the migration tool runs as a library in the filer software itself. The migration tool provides a user interface (typically a command line), and it is designed to be easily configured (e.g., to identify the host address, port, etc., any credentials need to mount the local server, the path to the local server, a cloud configuration, any credential needed to access the cloud, a public key, and so forth). Typically, the migration tool itself does not support the integrated service itself (that is provided by the filer) but, rather, it is designed simply to migrate the initial enterprise data set, thereby producing a single version. While the cloud-native global file system (as described in FIGS. 1-5) is a versioned filesystem, the root of a tree by the migration tool matches the version of when it was attached to its owning volume. Once migration is complete, the filer takes over the go-forward processing in the manner described in detail above.

Figure 6:
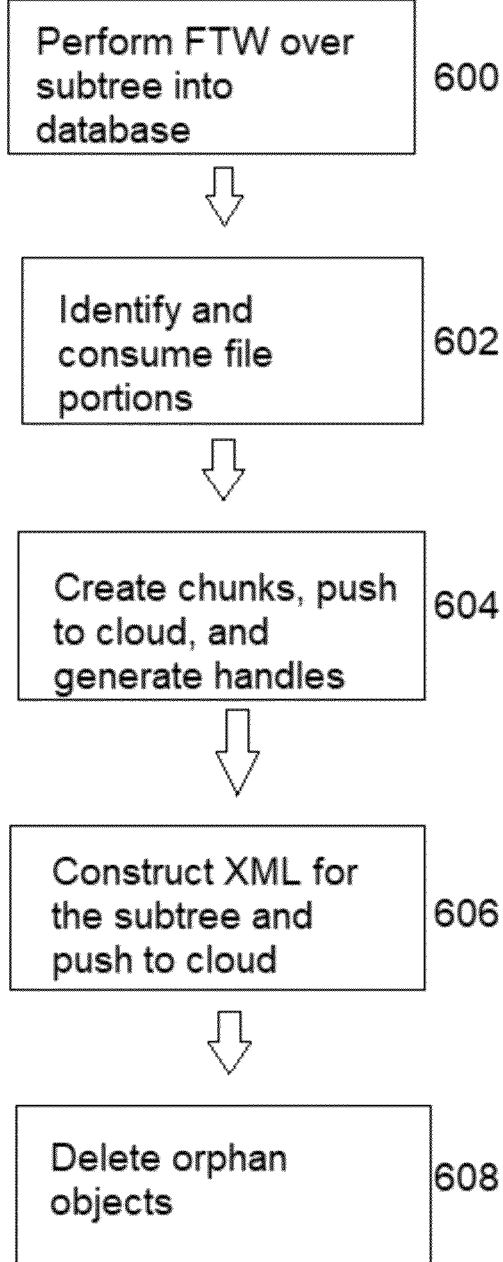
FIG. 6 depicts a process flow for a direct-to-cloud migration technique according to this disclosure.

A basic operation of the migration tool is depicted in FIG. 6. At step 600, the migration tool performs a walk (e.g., using Linux File Tree Walk (FTW)) over a migration subtree into a database operated by the tool. At step 602, the file portion of the database is consumed. At step 604, file chunks are created, pushed to the cloud, and their handles recorded. At step 606, directory XML is constructed for the subtree and pushed up to the cloud. At step 608, any orphaned objects are delete. The overall loop (steps 602-608) can be repeated a number of times as necessary. Typically, the first run takes a relatively long time but moves a bulk of the data. A second rune then handles changes since the first run, and so on for additional iterations of the loop. On each run, preferably the migration tool reports back (e.g., on the command line or other interface) how many new or changed objects (and their sizes) were found. Once this number is small enough, the migration is almost caught up, and a read-only or offline final catch-up run is done. Any data orphaned due to replacement by additional runs preferably is then deleted. Similarly, a cancelled migration is effectively orphaning all already-written data, and thus it is deleted as well.

Given the above, in one embodiment, one or two passes are run to move the bulk of the data, after which the filer is used (if need be) for any remaining migration. In another embodiment, multiple passes are run until the system is almost caught up, after which a final way is scheduled in such a way (e.g., making the file server read-only, restricting users, or the like) that ensures that no further changes can happen. The migration tool preferably exposes to the enterprise user several options, e.g., whether to run the tool in multiple passes, in a single pass, or the like. Regardless of how many passes are done, the end result is a single handle, representing the directory manifest for the root of the migrated data. This is not necessarily the root of the volume but, rather, it is the root of the tree that was migrated. This affords maximum flexibility and allows for scale-out, as multiple subtrees thus can be migrated at once.

Following the migration, the migrated data is then attached as follows. In particular, to attach migrated data the handle that is output from the above-described processes needs to be connected to an existing volume. This can occur on any empty directory. In one embodiment, the filer user interface provides the user a function to attach an arbitrary directory manifest handle to a directory on a filer. The target directory must be empty, but it can be at any level (i.e., it need not be a root directory). The object store for the volume being attached needs to be the same as that used for the migration (i.e., the same store, same bucket, etc.). The key for the volume being attached does not need to be the same as that used for the migration, but if it does not match then the migration key needs to be added to the volume (although it need not be active).

The direct-to-cloud migration tool functionality itself may be scaled (i.e., be scale-out capable). In an alternative embodiment that is used for a more large-scale migration, automatic scale-out of a large data set is enabled by pooling multiple migration machines (e.g., an elected controller machine and multiple data movers), and calculating (assigning) a reasonable division of (migration) labor automatically. If the tool is just configured for manual processing, and given that the approach envisions that subtrees can be migrated and re-attached concurrently, scale-out can be provided manually by simply running multiple instances of the migration tool. For example, given a filesystem that comprises/company/div/engineering, /company/div/marketing, and company/div/sales, one approach is to run a single migration job for all three or, instead, to use three jobs, one for engineering, one for marketing, and one for sales. This flexibility allows the enterprise to migrate all three complete subtrees concurrently. Once each job is complete, each subtree (namely, its associated handle) is simply attached to an empty directory on the filer, as described above.

Preferably, the migration tool utilizes bandwidth shaping (quality-of-service (QoS)). Preferably, the shaping is configurable, e.g., based on day of week, hour of the day, or the like. When migration is carried out over a scale-out cluster (such as described above), the QoS is applied to the cluster as a whole. In addition, preferably egress to the object store in the cloud as well as ingress from the source file server also is shaped.

Although not a requirement, the migration tool (which as noted above operates its own running database) may implement deduplication as objects of the subtree are created and pushed to the cloud. In one embodiment, deduplication is carried out within a particular direct-to-cloud migration job.

While migrating, transformation rules may be applied, e.g., to remap files into a new organization. For example, if an original directory layout is not what the customer wants to use in the global file system, the migration tool is configured to remap the files in association with the migration. Similarly, the tool provides a mechanism to add/remove/permute access control lists (ACLs) or other permission metadata as part of the migration.

When the migration tool is implemented as a virtual machine (VM), e.g., a bootable image executing on VMWare®, the VM may be sized as necessary with respect to CPU, memory and disk requirements. When more concurrent processes (jobs) are to be run, more processors are requested. With more memory, more chunks can be pushed to the cloud concurrently. Preferably, a ramdisk is used for chunk encryption and staging before pushing to the cloud. The disk needs to be large enough to store the metadata database used during the migration. One or more migration (virtual) machines may be run on the same hypervisor, on different hypervisors, etc., and they may use different data stores. Preferably, the CPU, memory and disk resources used to support the virtual machine(s) are automatically configured based on the available resources. For example, the CPU count can autoconfigure thread count, while the memory size can autoconfigure the number of concurrent chucks that are pushed to the cloud, etc.

Preferably, all data written to the cloud is encrypted.

Preferably, the migration tool is configurable to send hints to a filer (or set of filers) to autofault so that the filer(s) prewarm their caches with data that was migrated.

The following section provides additional details regarding one embodiment of an implementation of the direct-to-cloud migration technique described above.

Enterprise Integration/High Level Customer Experience

The solution may be implemented as follows. An enterprise customer identifies a hypervisor and resources that are available to support a production instance of the migration tool, which is then supplied via secure download as a pre-built image from which a virtual machine (VM) is then created. The pre-built VM image is sometimes referred to herein as an appliance. Once instantiated in the operating environment, the instance is accessed for configuration, preferably using the following variables: source share, share access credentials, cloud target, cloud credentials, public (not private) cloud encryption key, and any bandwidth restrictions.

After the appliance is configured, preferably it produces a disaster recovery key that can be used to recover the migration in the event that the appliance is lost. The disaster recovery key is stored until the import run is fully complete, at which time it can be discarded. Optionally, the appliance is put in a reconnaissance mode where a particular function (called a "walker" as described in more detail below) gathers information about the source filesystem without packing (as also described below) taking place. This operation can be used to provide insight to the source filesystem, informing an operator as to the scope of the migration. Based on the insight, the migration database may be pre-configured (e.g., with a given heuristic) so that certain files are preferred, thereby potentially speeding up the initial phases of the import.

When an import job is launched the appliance preferably shows status information pertaining to the current statistics of the job. This informs the operator at a high level about the current operations, files discovered, and contents in the cloud. This data preferably is furnished from the running processes and the state reflected in the database (all as described below). While the job is running, preferably there are two (2) primary actions available: pause, and complete. The pause action allows the job to be paused, during which time some configuration changes can be made (e.g., bandwidth modifications). From the pause state, an abort action may be run, thereby causing the appliance to clear out a cloud entity it has created. The complete action can be taken at any time deemed appropriate by the operation of the import run. This may be when the filesystem is 100% imported, in which case the appliance then is left continually scanning for changes, or sooner. Once the complete is invoked, walking (as described below) ceases and remaining directory metadata stitching together the individual files is written. As described above, upon full completion of the import run, a root handle is produced for use to locate the imported tree for final stitching.

A final step typically takes place on an edge appliance with access to the volume to which the imported filesystem is to be attached. A location in the volume together with the handle output by the import is entered and confirmed. The data imported by the run is then available for faulting in to the local cache.

After import, the appliance created for the import run, as well as the disaster recovery key, can be or is discarded.

Preferably, the appliance is designed for single use in this manner, although this is not a requirement. When a filesystem is too large for a single appliance, one or more additional appliances are added to spread the load. Preferably, an appliance works on a single tree, and thus the import of a large tree can be split into multiple imports of individual subtrees. In such case, each appliance takes responsibility for a subtree, and each subtree is then grafted into a separate volume or integrated back into a single volume that looks like the original. These appliances are run in parallel or serially depending on the environment.

Detailed Design

Figure 7:
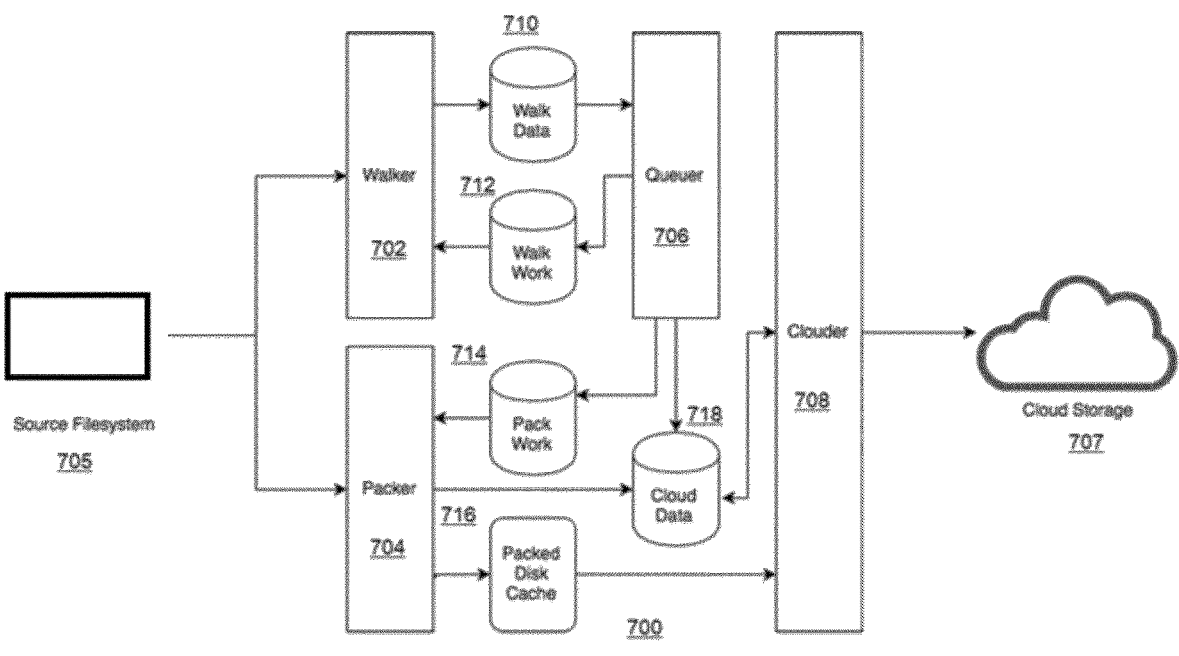
FIG. 7 depicts a representative design architecture for the migration tool of this disclosure.

FIG. 7 depicts a representative architecture for the migration tool. As noted above, preferably the tool is a single use Linux appliance 700 that comprises a number of distinct components that cooperate to enable the overall operation. These components are a walker 702, a packer 704, a queuer 706, and a clouder 708. The tool also comprises a database 710, a walk work queue 712, a pack work queue 714, a packed disk cache 716, and a cloud data store 718. Although these components and the storage elements are shown separately, this is not required. There may be one or more instances of each of the components 702, 704, 706 and 708.

The walker 702 monitors the source filesystem 705 (that is being migrated) and records state (walk data) in the database 710. The packer 704 packs files and directories to a relevant format (e.g., Nasuni® UniFS) as selected by the queuer, and the packed files are stored in the packed disk cache 716. The queuer 706 manages the workload and directs the order of walking and packing operations, and control information to that end is stored in the walk work queue 712 and the pack work queue 714, respectively. The clouder 708 uploads the packed files from the packed disk cached 716 and keeps cloud state consistent. These components communicate and store their state in the database 710.

The basic high level operation is as follows. The customer gains access to the VM image, downloads and starts it. After the initial configuration (as previously described) the appliance goes into observation mode and the walker 702 is started. Administrators can scale up or down the aggressiveness of the walker depending on the load observed on the import filesystem. As the walker runs it gathers information on the filesystem and starts to reveal the scope of the work. As changes are detected on the filesystem during walking, this is also recorded in the database 710. During this phase, one or more transformation rules may be instantiated, and example files can be put through analysis to evaluate the rules. In this manner, this phase may provide the user insight regarding how much work is required for the migration while the filesystem is quiesced. Once the observation is complete and the configuration set, ingestion is started. During this phase the queuer 706 feeds work to the packer 704, which in turn feeds the clouder 708. As data is added to the cloud 707 the progress can be monitored. As all state in recorded in the database 710, a status report is generated to give an overview of the current state. Eventually, the only non-ingested items (which may be highly volatile) are left needing migration. Once the ingestion phase has finished as far as possible, and an appropriate maintenance window is opened, the completion phase is entered. At the point, the customer either re-mounts the filesystem as read-only or otherwise guarantees quiescence, and then appliance is signaled. The appliance finishes any packing and uploading of any entities that are still not fully reflected in the cloud, and then outputs the root handle. As noted, the handle is for the top level directory manifest that was created. The customer then preferably uses a filer interface (e.g., a web-based management console or page) to select where the tree should appear in a volume (typically, one that is already-configured). The filer then writes a new version of that volume that includes the supplied handle. The volume is then used in place of the imported filesystem. If, any point the ingestion is taking too long, the customer may enter the completion phase at any arbitrary point and continue the migration using the filer.

Thus, according to this approach a file is first seen by the walker 702, which gathers basic information on the file and records it in a filesystem model held in the database 710. When the packer 704 decides that the next batch of files to be packed will include the file in question, one or more entities into which the file will be packed are defined. The definition for the cloud entities is stored in the database 710, and it is referenced in new pieces of work in the pack work queue 714. As the packing queue 712 is processed, parts of the file are packed. The data content of the file is read in chunks (preferably as specified by the packer 704) and packed into the appropriate chunk format on disk cache 716. When the chunk is written and synced, the work is marked as complete. The manifest for the file is compiled similarly, however, the information for the manifest preferably is created from metadata of the file, and it may include an additional filesystem query to gather additional attributes, such as ACLs.

Each of the cloud entities that make up the file are found on-disk 718 by the clouder 708, which preferably uploads the entities individually. As each is uploaded, preferably it is removed from disk, and its representation in the database 710 is marked as uploaded. The marking in the database preferably only occurs after the clouder has confirmed (e.g., via hash) that the file was successfully uploaded. Once uploaded and marked as such, the file is removed from the disk 718.

The following provides additional details regarding the above-described components.

As described, the walker 702 gathers information from the filesystem and records it to the database. An individual walker process queries a work table (in walk work 712) to find directories that need to be scanned. The walker then examines the directories and the file they contain, gathers basic metadata (size, times, etc.), and reflects that information in the database. Once complete, more work is collected from the work table in the walk table. To allow for proper fan out and heuristics, preferably a walker process does not descend into found directories or otherwise perform recursion; instead, such decisions preferably are deferred to the queuer. Thus, in operation, a walker (and there may be several instances) collects (from the walk work queue 712) a list of directories to check next, examines files and directories (via OS mount), evaluates changes in stat information to determine changes, and stores file and directory state in the database. Its inputs are queries to the work table and its connection to the source filesystem, and its output are the file and directory tables. Preferably, the number of walker queries to the source filesystem are tunable.

The queuer 706 provides the main control functionality of the instance. In particular, it monitors the progress of other components and populates work queues 712 and 714 to guide the other components to their next tasks.

The following describes the queuer's interaction with the walker 702. In particular, the queuer 706 monitors the progress of the walker 702 and guides the walker's investigation. In particular, work generated for the walker (or an instance thereof) consists of which folders to examine next. The queuer queries the walker tables to obtain a list of directories that are most in need of refreshing in the database. These directories are then listed in the walk work queue 712 for the processes of the walker component to check next. A length queue of work left for the walker component to do is the primary trigger for the queuer to create a next batch. Preferably, initial heuristics for work generation are pass-based, with a priority placed on having each directory re-walked in each pass. Alternatively, the heuristic monitors hot areas of the disk more frequently.

The following describes the queuer's interaction with the packer 704. In particular, the queuer 706 monitors the process of the clouder 708 to guide the timing of a next batch for the packer. The size of batches typically is constrained by the amount of disk space 718 available for the packer to cache packed data for the clouder to upload. At any one time preferably there are one to two batches in a disk queue. In particular, preferably there is always a complete batch being uploaded by the clouder 708. If sufficient space exists, a second batch should be being packed. The size of packing batches should generally be as large as possible. This facilitates fewer queries against the walker tables and less journal files.

Thus, in summary the queuer monitors the filesystem database 710 for what needs to be walked next, creates batches of work for the packer and records the information in a work table, cleans and maintains work tables for the walker and packer, and outputs status information. Its inputs are queries to the walker tables (for entities not recently walked, or ready to be packed), and querying cloud tables for any orphaned entities (deleted or moved files). Its outputs populate the walker work table and the packer work table, journal files (via the packer), and status information.

As described above, the packer 704 is responsible for pulling data from the source filesystem and transforming it into the desired cloud format. The packer packs entities (e.g., using gpg), sources metadata from the source filesystem, manages XML generation (the cloud object format), and invalidates work on change detection. Its inputs are queries to the packer work table, and its connection to the source filesystem, and its outputs are packed data for upload, and packing metadata (hashes, sizes, etc.).

As also described above, the clouder 708 is used to move packed source data to the cloud 707. The clouder preferably also is responsible for rectifying cloud state when it gets out of sync with the source filesystem. In operation, the clouder is responsible for pushing packed entities and marking in the database, and it is also responsible for cleaning already pushed entities that need to be removed. Its inputs are packed cloud data (from disk) for upload, and querying cloud tables looking for orphans; its outputs are the network traffic to the cloud, and updates to cloud tables to reflect actions taken.

The database 710 is used to track the filesystem to ensure that its state is fully reflected in the cloud. In addition, the cloud is tracked to ensure that changes in the filesystem are accurately reflected in the cloud, and that no data is leaked.

As noted above, preferably a disaster recovery mechanism is included in the tool. In one approach, write ahead journaling is used. As batches of work are created by the queuer, this work (namely, the paths, times, hashes and handles) are written to journal files that preferably are uploaded before any of the packed entities to be created by the batch. These journals can then be used to repopulate the key information in a new instance of the migration image, or as a listing of what needs to be removed. The journal files typically contain sensitive customer information and, as such, are encrypted. A public key pair exclusively for use by the image thus is utilized. Preferably, the key pair is generated by the instance at the start of a direct-to-cloud migration. That key pair is saved by the cloud service provider associated with the migration in the event of some failure that cannot be recovered from. When a disaster recovery commences, a fresh (new) image is tasked with recovering the work from the failed instance and, to that end, the new image is supplied with the key pair generated by the initial (now failed) instance. The key pair is then used to decrypt the journal files to seed the recovery.

The following describes metadata handling. Basic metadata, such as times and files sizes, are collected as part of the walker process and recorded in the database. Given the preferably more limited focus of the walker, more detailed metadata (such as held in xattrs) is not collected by the walker. That metadata preferably is collected by the packer that forms the manifest for the file in question. Basic metadata collected in walking is stored in the walker tables (for assessing if entities have changed), whereas the extended data (in xattrs) is only needed for manifest generation and thus preferably is only store in packed XML.

The approach herein has numerous benefits. It is simple to deploy, greatly simplifies migration, and it operates at scale. Using the approach described, direct access to the filer data structure is enabled (via the migration tool in the disclosed embodiment) without having to go through the filer directly. The approach herein, which provides for direct to object data migration, enables a user to take an existing available filesystem (e.g., NFS/CIFS) and construct a single version of the scalable file system with all of the files, directories and permission structures. The migration tool preferably runs on-premises, and the target is any supported object store. For the volume to "go live," it only needs to be stitched to an owner filer. At that point, the filer then begins to create fresh new versions on top of the base version.

The above-described direct-to-cloud technologies may be leveraged and used in other contexts where it may be desired to selectively bypass the filer.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an Intel-based hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

In the preferred approach as described, filers do not communicate directly with one another but, instead, communicate through a hub-and-spoke architecture. Thus, the notification mechanism typically leverages the intermediary (e.g., NMC) for passing the queries and responses, as has been described. In an alternative embodiment, and depending on the underlying architecture, some filer-to-filer communication may be implemented.

Having described our invention, what we claim is as follows:

1. A method to migrate a data set to a cloud-based object store associated with a cloud-based storage service, comprising:

pooling together a set of migration machines, wherein at least one migration machine in the set comprises hardware and software;

based on a size of the data set, automatically determining a division of migration labor across the set of migration machines; and migrating the data set to the cloud-based object store using the set of migration machines;

wherein migrating the data set further includes applying a configurable Quality of Service (QOS) to a portion of the data set as the portion is migrated to the cloud-based object store by a given one of the set of migration machines.

2. The method as described in claim 1 further including taking a given action with respect to permission metadata associated with the data set during migration of at least a portion of the data set.

3. The method as described in claim 2 wherein the given action is one of: adding an access control list (ACL), removing an ACL, and permutating an ACL.

4. The method as described in claim 1 further including encrypting at least a portion of the data set prior to migrating the portion to the cloud-based object store.

5. A method to migrate a data set to a cloud-based object store associated with a cloud-based storage service, comprising:

pooling together a set of migration machines, wherein at least one migration machine in the set comprises hardware and software;

based on a size of the data set, automatically determining a division of migration labor across the set of migration machines; and migrating the data set to the cloud-based object store using the set of migration machines;

wherein migrating the data set further includes applying a transformation to a portion of the data set as the portion is migrated to the cloud-based object store by a given one of the set of migration machines.

6. The method as described in claim 5 further including taking a given action with respect to permission metadata associated with the data set during migration of at least a portion of the data set.

7. The method as described in claim 6 wherein the given action is one of: adding an access control list (ACL), removing an ACL, and permutating an ACL.

8. The method as described in claim 6 further including encrypting at least a portion of the data set prior to migrating the portion to the cloud-based object store.

* * * * *